Oct. 28, 1969    R. H. WEICHSEL    3,475,065
GAS BEARINGS OF THE LINEAR MOTION SINGLE PLANE TYPE
Filed Feb. 15, 1967

Inventor
RICHARD H. WEICHSEL
by John Mahoney
Attorney

United States Patent Office 3,475,065
Patented Oct. 28, 1969

3,475,065
GAS BEARINGS OF THE LINEAR MOTION SINGLE PLANE TYPE
Richard H. Weichsel, Hudson, Ohio, assignor to The Apex Bearings Company, a corporation of Ohio
Filed Feb. 15, 1967, Ser. No. 623,489
Int. Cl. F16c 29/02, 29/00, 33/00
U.S. Cl. 308—5        5 Claims

ABSTRACT OF THE DISCLOSURE

A rectangularly-shaped housing having a peripheral flange and a similarly-shaped cavity therein, a labyrinth of grooves and channels separated by land in said cavity, and a porous plate arranged within the cavity of the housing which rests upon the lands and covers the grooves and channels and is secured to the housing. The assembly is movable upon a base plate with the porous plate resting upon the base plate. The porous plate is composed of spherically-shaped copper particles encapsulated with sintered tin to form a myriad of gas restrictive pores. The porous plate is of sufficient thickness to support the static load at the working surface and the grooves and lands are of substantially the same width as the thickness of the porous plate and the depth of the grooves and channels between the lands are approximately one-half of the thickness of the plate. Means is provided for passing a gas into the grooves and channels, the flow of which is restricted when passing through the pores of the plate, which gas then expands to form a thin uniform film between the porous plate and the base plate on which the assembly is movable.

---

The present invention relates to gas bearings, such as air, engine exhaust gases, or the like, and more particularly to linear motion gas bearings of the single plane type.

To prevent vibration in a compressed gas bearing, there must be a limited amount of gas in communication with a lubricating gas film. In other words, there must be a restriction between the lubricating compressed gas film and a compressed gas source to isolate the gas supply from the film to thereby dampen vibrations. The restriction, however, must not be sufficient to prevent a sufficient flow of gas to provide pressure on the film.

In gas bearing systems, it has heretofore been proposed to utilize a bearing having multiple holes leading to the gas film. In such bearings, however, the restriction varies with the thickness of the film and it is difficult to obtain a substantially uniform load supporting film. It has also been proposed to utilize porous type bearings through which a gas may be passed to provide the film. In bearings of the porous type, gas restriction occurs ahead of the port of entry of the gas to the film. Restriction therefore does not vary with the thickness of the film and consequently a gas bearing can be more easily loaded than with the multiple hole feed bearings. In porous type bearings as previously provided, however, considerable turbulence occurs and it is difficult to provide a thin substantially uniform gas bearing between a porous plate and a stationary base member upon which the plate is movable in a linear direction.

In accordance with the present invention, a gas bearing of the linear motion type is provided including a machinable housing having a cavity therein in which a plurality of grooves are formed which are separated by lands of substantially the same width as the grooves. The housing also includes a plate having gas restrictive pores therein fitting within the cavity of the housing which is supported upon the lands and covers the grooves and in which the housing is also provided with a tapped opening through which a gas may be passed into the grooves so that when the housing is inverted and placed upon a flat stationary base member, such as the bed way of a machine tool, the gas may be forced through a substantial area of the porous plate and will form a thin uniform air bearing substantially free from turbulence between the porous plate and a flat stationary base plate to thereby facilitate the linear movement of the housing in opposite directions.

Figure 1:
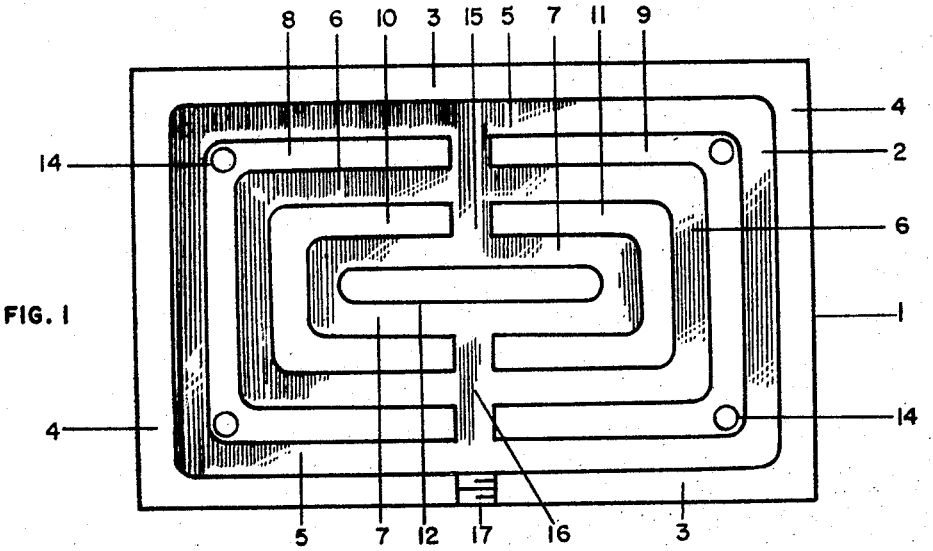
Figure 2:
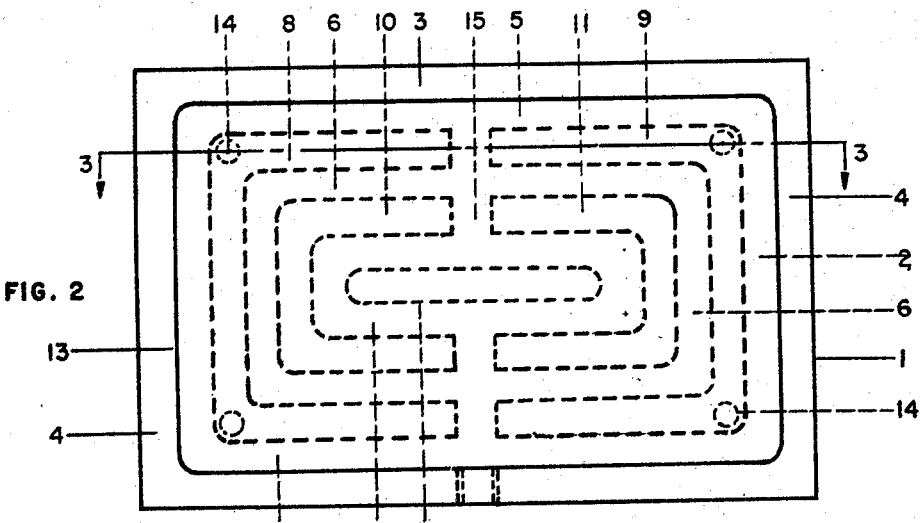
Figure 3:
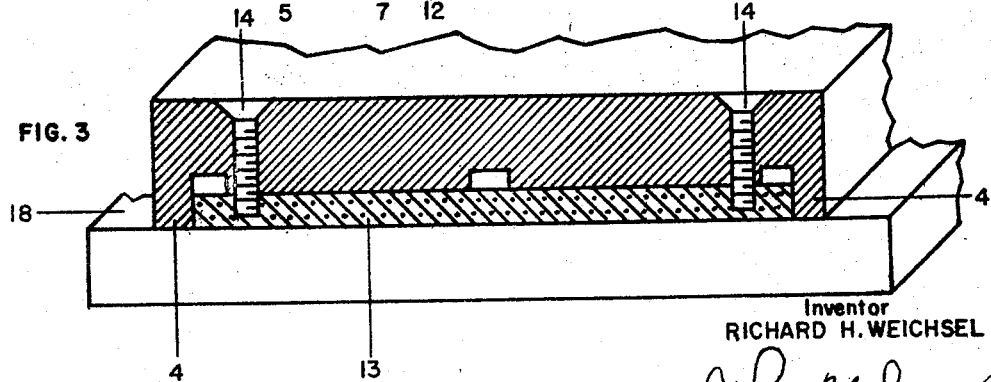

My invention will be better understood by reference to the accompanying drawings in which:

FIG. 1 is a lower plan view of an outer metallic housing showing a labyrinth of grooves therein separated by lands;

FIG. 2 is a view similar to that shown in FIG. 1 but showing a porous plate arranged inwardly of a peripheral flange on the housing and extending over the grooves therein; and FIG. 3 is an inverted cross sectional view of the bearing taken on a plane passing through the line 3—3 of FIG. 2 and showing the bearing mounted upon the bed plate upon which it may be moved backwardly and forwardly in a linear direction.

As illustrated in the drawings, a housing 1 is provided which may be formed of any suitable machinable metal, such as steel, aluminum, or bronze. As shown, the housing is rectangular in shape and is trappaned out to form a similarly shaped recess providing a central cavity 2 in which a labyrinth of grooves or passages 5, 6 and 7 are machined. As shown in the drawings, groove 5 is arranged between the flanges 3 and 4 of the housing and the U-shaped lands 8 and 9, groove 6 is arranged between lands 8 and 9 and lands 10 and 11, and groove 7 is arranged between lands 10 and 11 and a central land 12.

As shown in FIGS. 2 and 3 a porous plate 13 arranged over the cavity of the outer housing within flanges 3 and 4 and resting upon lands 8, 9, 10, 11 and 12 is held in position by screws 14 which pass through apertures in the outer housing and lands 8 and 9 and are threaded into tapped apertures in porous plate 13.

While the plate 13 may be formed of any suitable porous material affording sufficient feed therethrough to provide and sustain a substantially uniform film between plate 13 and a base plate upon which it is linearly movable, it is preferably composed of a commercially available material, such as "Oilite" which consists of a body composed of copper spheres of approximately 100 mesh and of substantially uniform size which are encapsulated with sintered tin particles. In preparing the plate 13, spherically-shaped copper particles of approximately 100 mesh and tin particles of approximately 200 mesh are first pressed into a unitary structure and sufficient heat is then applied to sinter the tin. A temperature of approximately 1535° Fahrenheit may be used. The temperature, however, should not be sufficient to liquefy the copper. The copper therefore retains its spherical shape which is encapsulated with sintered tin particles forming gas restrictive pores in which a gas passing through the plate meets its maximum restriction which is evidenced by a substantial pressure drop. After the gas passes outwardly through the gas restrictive pores, it expands to form a thin nonturbulent film of gas which lies in close proximity to the outside surface of the porous plate 13.

In preparing plate 13, the small copper spheres preferably constitute the major proportion of the plate and while I do not desire to be limited to any particular proportions, the copper spheres may be present in an amount ranging from approximtaely 60% to 90% and the tin in proportions ranging from approximately 10% to 40%. For instance, the plate 13 may be composed of approximately 90% copper spheres and 10% of sintered tin which encapsulates the copper spheres to provide gas restrictive pores through which the gas passes.

To properly supply the porous metal plate with a sufficient amount of gas, the construction should be of a nature to allow the pressure head to be uniform at the working surface. To obtain this uniform head, the normal linear wall thickness of the plate 13 should be in keeping with that which is required to support the static or at rest load at the working surface. Having thus established the lateral wall thickness of plate 13, this linear measurement should constitute the width of both the grooves 5, 6 and 7 and the ribs or lands 9 and 11. As shown, the depth of the grooves should be approximately one-half of the width of a groove. With such an arrangement, a gas, such as air, flowing from tapped opening 17 into grooves 5, 6 and 7 is first restricted by the gas restrictive orifices in the plate and then expands to form a thin nonturbulent uniform film between the plate 13 and the flat base plate.

In practicing my invention, the housing 1 should be comparatively long, such as from approximately three to five inches and approximately two to three inches wide. The assembly consisting of the housing 1 and the porous plate 13 is then inverted so that the porous plate will rest upon a stationary base plate 18 which may be the bed way of a machine tool which is shown partly broken away in FIG. 3.

As illustrated in FIG. 1, the lands 8 and 9 and 10 and 11 are spaced from each other to provide straight channels 15 and 16 of substantially the same width as grooves 5, 6 and 7 which lead from grooves 5 and 6 to the central land 12. A straight groove is therefore provided from which extend a plurality of grooves which are parallel with the side and ends of the outer housing but gradually decrease in size from the outer groove 5 to the inner groove 7.

To provide the bearing, a gaseous medium, such as air, is forced into groove 5 through conduit means attached to a threaded inlet socket 17 and then through substantially straight grooves 15 and 16 from whence it flows through grooves 6 and 7 to the central land 12. The air passing into the labyrinth of grooves also contacts and flows through plate 13 where it is restricted in its passage by the gas restrictive pores. The gas then expands and forms a thin uniform film between the plate 13 and the flat bearing surface 18 which as previously stated may be the bed way of a machine tool.

In the present invention in which a plate having a myriad of gas restrictive pores therein is utilized, the air restriction occurs ahead of the entry of the air to the film and consequently the bearing may be more easily loaded and will have better stiffness than when air is introduced through multiple holes. The porous plate has a further advantage in that it cannot be plugged and the distribution of the gas at a plurality of points into the surface of the gas film which extends over a substantial area provides high load capacity. It will also be apparent that only a small portion of the gas passes beyond flanges 3 and 4 of the housing and because of the restriction of the gas in passing through porous plate 13, there is an economy in the amount of gas necessary to provide the bearing.

What I claim is:

1. A bearing including a machinable housing having a rectangularly shaped cavity therein, means for providing a labyrinth of substantially rectangular-shaped grooves in said cavity including a central land and a series of substantially U-shaped lands arranged in said cavity between said grooves and providing oppositely disposed channels extending from the outer groove to the central land, a plate having gas restrictive pores arranged within the cavity of said housing and resting on the lands and covering said grooves, and means whereby a gas may be passed through the grooves of said housing and through the pores of said plate to form a thin gas film between said porous plate and a flat plate on which said bearing may be moved linearly.

2. A bearing as defined in claim 1 in which means are provided for connecting said porous plate to the housing.

3. A bearing as defined in claim 1 in which the linear thickness of the porous plate is substantially the same as the width of the lands and grooves in said housing.

4. A bearing as defined in claim 3 in which the depth of the grooves in said housing is substantially one-half of the thickness of said porous plate.

5. A bearing including a machinable housing having a cavity therein and a peripheral flange, means for providing a labyrinth of substantially rectangularly-shaped grooves in said cavity including a central land and spaced U-shaped lands arranged in said cavity between said grooves and defining oppositely disposed channels extending from the outer groove to the central land, a plate provided with gas restrictive pores resting upon said lands and covering said grooves, means connecting said plate to said housing, said plate having edges which are substantially the same thickness as the peripheral flange of said housing, and means whereby a gas may be forced through said grooves and into contact with said plate to form a gas film between said plate and a flat surface when the housing is inverted and moved linearly over said surface.

References Cited

UNITED STATES PATENTS

| | | | |
|---|---|---|---|
| 2,683,635 | 7/1954 | Wilcox | 308—9 |
| 2,683,636 | 7/1954 | Wilcox | 308—9 |
| 2,696,410 | 12/1954 | Topanelian. | |
| 2,937,294 | 5/1960 | Macks | 308—9 X |
| 3,070,407 | 12/1962 | Hughes. | |
| 3,001,609 | 8/1961 | Macks. | |
| 3,103,364 | 9/1963 | Macks et al. | |
| 3,104,496 | 9/1963 | Macks. | |
| 3,156,399 | 11/1964 | Wadey. | |
| 3,360,309 | 12/1967 | Voohries | 308—9 |
| 2,645,534 | 7/1953 | Becker. | |

FOREIGN PATENTS 796,926 6/1958 Great Britain.

OTHER REFERENCES

Mueller, Air Lubricated Bearing Product Engineering, 1953 Annual Handbook, p. J2.

WENDELL E. BURNS, Primary Examiner

U.S. Cl. X.R.

308—9